United States Patent [19]

Tallman

[11] Patent Number: 4,953,695
[45] Date of Patent: Sep. 4, 1990

[54] PROTECTIVE COVER FOR EYEGLASSES

[76] Inventor: Brett C. Tallman, Lupfer Ave., Box 1261, Whitefish, Mo. 59937

[21] Appl. No.: 410,785

[22] Filed: Sep. 22, 1989

[51] Int. Cl.⁵ .............................................. B65D 85/38
[52] U.S. Cl. ...................................... 206/5; 224/257; 351/155
[58] Field of Search ..................... 206/5; 224/202, 203, 224/205, 257, 258; 351/155, 157, 158

[56] References Cited

U.S. PATENT DOCUMENTS

| D. 168,138 | 11/1952 | Baratelli | 206/5 |
|---|---|---|---|
| 410,798 | 9/1889 | Long | 206/5 |
| 636,811 | 11/1899 | Kirstein | 206/5 |
| 1,158,169 | 10/1915 | Bradley et al. | 206/5 |
| 1,834,419 | 12/1931 | Pratt | 206/5 |
| 2,262,142 | 11/1941 | Karmsen | 206/5 |
| 2,353,413 | 7/1944 | Nathan | 206/5 |
| 2,554,630 | 5/1951 | Miller | 206/5 |
| 2,739,698 | 3/1956 | Baratelli | 206/5 |
| 2,866,539 | 12/1958 | McCulloch | 206/5 |
| 2,966,985 | 1/1961 | Morris | 206/5 |
| 3,819,033 | 6/1974 | Hueber | 206/5 |
| 4,401,209 | 8/1983 | Salmond et al. | 206/5 |

FOREIGN PATENT DOCUMENTS

| 0315495 | 5/1989 | European Pat. Off. | 351/155 |
|---|---|---|---|
| 8602463 | 4/1986 | Int'l Pat. Institute | 206/5 |

*Primary Examiner*—Jimmy G. Foster
*Attorney, Agent, or Firm*—Diller, Ramik & Wight

[57] ABSTRACT

A protective cover for eyeglasses formed of a generally tubular member having axially opposite open ends which is constructed from relatively resilient material and snugly houses therein at least the frame front and lenses of a pair of eyeglasses.

6 Claims, 1 Drawing Sheet

U.S. Patent  Sep. 4, 1990  4,953,695
FIG. 1
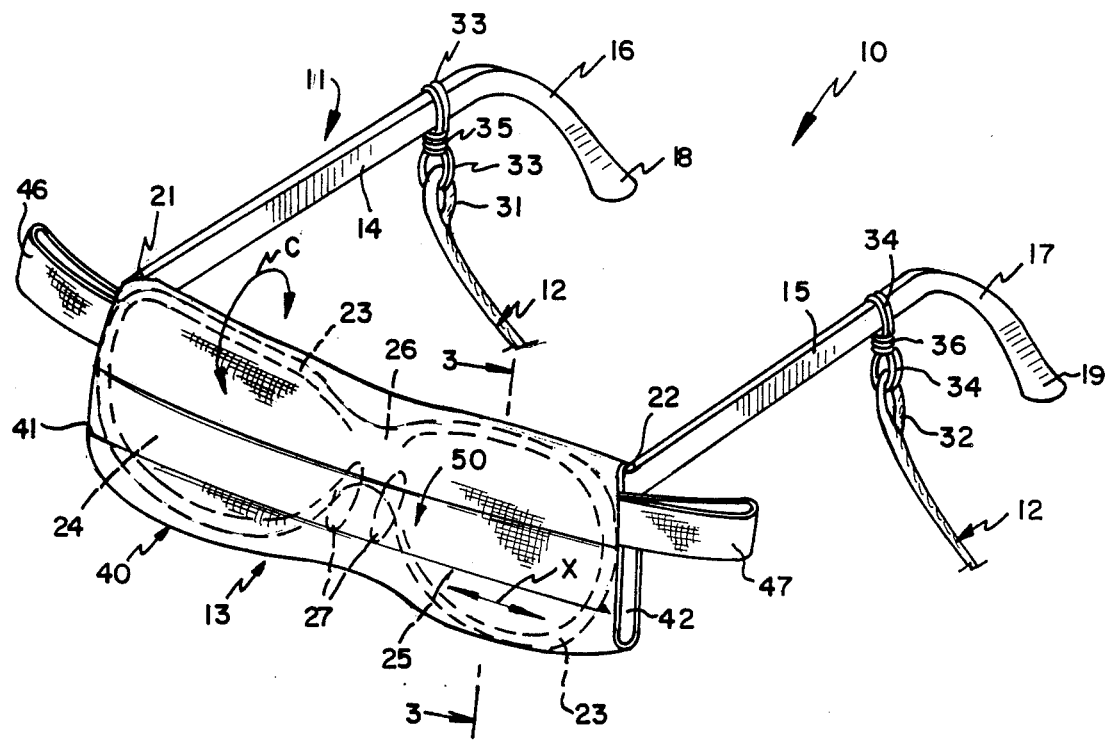
FIG. 2
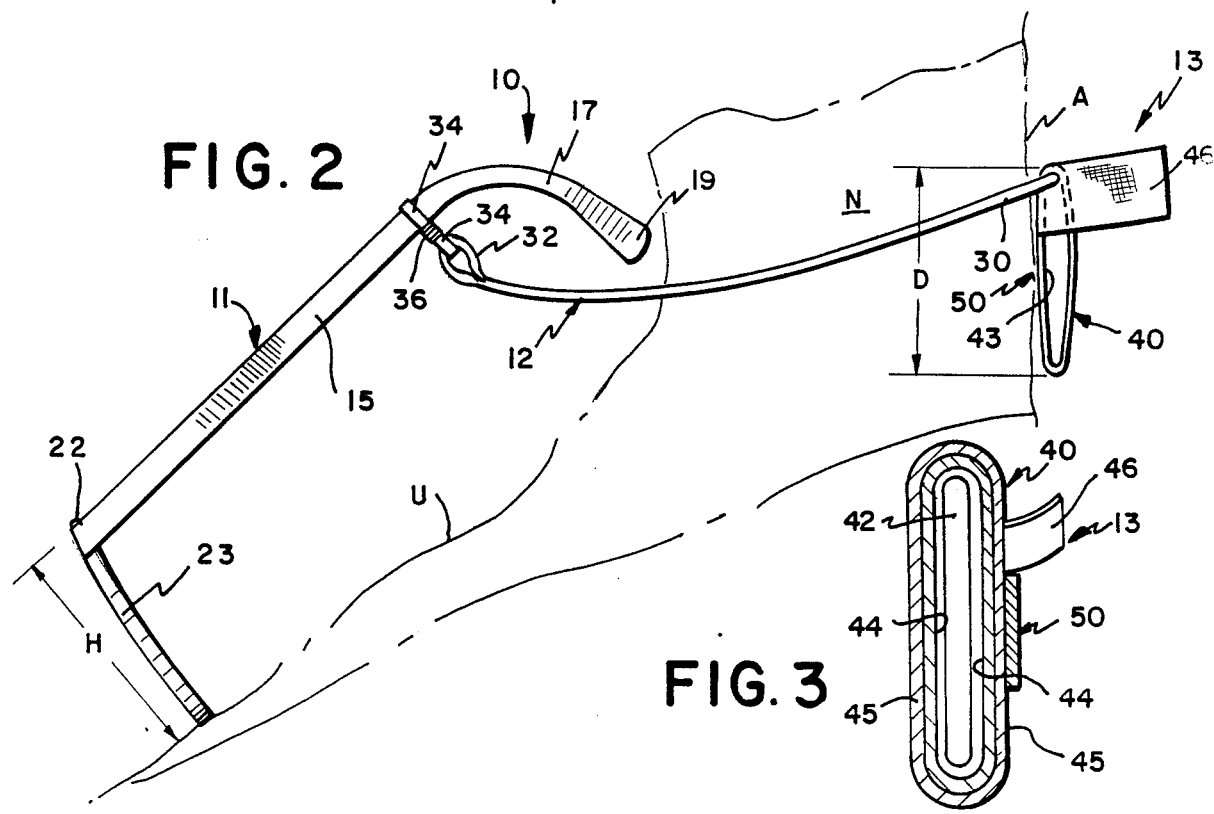
FIG. 3

PROTECTIVE COVER FOR EYEGLASSES

BACKGROUND OF THE INVENTION

The invention relates to providing a protective cover for eyeglasses, sunglasses or the like. Typically, eyeglasses or sunglasses are stored when not in use in either rigid or flexible so-called eyeglass cases. Normally such eyeglass cases include a pocket into which the eyeglasses are inserted and a cover is then closed and snapped shut. When eyeglasses are used the eyeglass case is simply placed in the user's pocket, perhaps in a purse, or is retained upon the user's belt to prevent loss. However, more often than not eyeglass cases are misplaced and/or lost, and in any event the ongoing association and disassociation of eyeglass cases and eyeglasses, as the latter are being used or not, is an ongoing source of frustration to the user.

SUMMARY OF THE INVENTION

In keeping with the foregoing, the present invention is directed to an eyeglass "case" which is essentially a protective cover formed as a tubular member having axially opposite open ends. The tubular member is also preferably constructed from relatively resilient material and is slipped over one of the temples of a pair of eyeglasses and onto the frame front thereof which includes as part thereof associated lenses, a bridge and nose pads. When thus positioned, opposite ends of an eyeglass cord or retainer, such as a conventional "Croakies" cord or retainer, is connected to the temple ear pieces in a conventional fashion. When this combination of the protective cover, eyeglasses and eyeglass cord is placed upon the neck of a wearer in encircling relationship thereto, the eyeglasses are suspended in a normal fashion in the area of the wearer's chest just below the wearer's neck and the protective cover snugly houses therein the frame front, the lenses thereof, the bridge and the nose pads of the pair of eyeglasses. Thus, in this inoperative suspended position the lenses are protected by the tubular protective cover, and since the latter is constructed from relatively thin, resilient, light-weight material, the user is hardly aware of the fact that the protective cover is being retained by the eyeglasses themselves.

When the user desires to remove the protective cover to use the eyeglasses, the protective cover is merely slipped from the front frame along either of the temple or temple pieces past the earpiece thereof and onto the eyeglass cord. The protective cover is preferably slipped along the eyeglass cord until centrally located between the ends thereof. The eyeglasses are then placed upon the wearer's nose and ears in a conventional manner and the protective cover is retained upon the eyeglass cord at the wearer's back generally at or slightly below the nape of the neck. However, since the protective cover is formed of light-weight resilient material the user hardly even notices the fact that the tubular protective cover is being retained by the eyeglass cord while the eyeglasses are in their in-use position. Thus, in this fashion the novel tubular protective cover of the present invention never need leave the proximity of the eyeglasses with which it is associated and can be retained essentially in one of two positions, namely, an operative position covering the lenses and an inoperative position retained upon the eyeglass cord. Thus it is virtually impossible to lose the novel protective cover of the present invention, particularly since the protective cover need not be removed from its position essentially in external telescopic relationship to the eyeglass cord and the front frame and temples of the eyeglasses or sunglasses.

If the combination of the eyeglasses, protective cover and eyeglass cord is to be "stored" other than on or in association with the neck of the user, the combination is simply removed by slipping the combination over and off the head of the user. When totally removed the combination can be stored two different ways. The tubular protective cover can be simply slid along the eyeglass cord, one of the temples and brought into external telescopic relationship to the eyeglass front frame, the lenses, the bridge and the nose pads thereof. The temple or temple pieces are generally exposed, as is the eyeglass cord. This "stored" position is particularly advantageous for the temporary storage of eyeglasses or sunglasses. For example, if one were wearing sunglasses while driving a motor vehicle, and encountered a brief or temporary overcast or rainy condition, one would simply hang the combination from the mirror of the vehicle by utilizing the eyeglass cord. The sunglasses would be readily at hand but the lenses thereof well protected by the protective cover and readily accessible for use upon the return of less cloudy, rainy skies and attendant sunshine.

Another storage option is to fold the temples or temple pieces against the frame front and slide the protective cover along the eyeglass cord over and in telescopic surrounding relationship to the now-overfolded temple pieces and the eyeglass frame front. In this case the temple pieces and end portions of the eyeglass cord are housed within the protective cover though a medial portion of the eyeglass cord is exposed externally of the protective cover and can be utilized as aforesaid, namely, to suspend the combination from a suitable support. This is also the desirable storage mode for storing the combination of the eyeglasses, protective cover and attached eyeglass cord in a suitable storage area, such as one's pocket, an automotive glove compartment, a fishing box, etc.

From the foregoing it is readily apparent that the present invention provides a permanent combination of a pair of eyeglasses, a resilient protective cover, and an eyeglass cord such that the protective cover is at all times associated with the eyeglasses whether being used in protective relationship to the eyeglass lenses or being "retained" or "stored" upon the eyeglass cord while the eyeglasses are being used. Clearly, the invention thus avoids the disadvantages of conventional eyeglass cases, particularly the continuous disassociation and reassociation of eyeglasses and eyeglass cases as the eyeglasses are worn or removed.

With the above, and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a perspective view of a novel combination of this invention, and illustrates a pair of eyeglasses including a frame front and a pair of temples terminating at ear pieces; an eyeglass cord or retainer having one of each ends connected to one of the earpieces, and a tubular protective cover formed from relatively resilient material in external telescopic relationship to the frame front and the associated eyeglass lenses.

FIG. 2 is a side elevational view of the combination of FIG. 1 and illustrates the protective cover removed from the frame front and the lenses and positioned at a medial portion of the eyeglass cord at the nape of a wearer's neck when the eyeglasses are "stored" at a chest area of a user.

FIG. 3 is a cross sectional view taken generally along line 3—3 of FIG. 1, and illustrates the two-ply construction of the protective cover.

DESCRIPTION OF THE PREFERRED EMBODIMENT

A novel combination of the present invention is generally designated by the reference numeral 10 and includes a conventional pair of eyeglasses or sunglasses 11, a conventional eyeglass cord or retainer 12 and a novel protective cover 13.

The eyeglasses or sunglasses (hereinafter, eyeglasses) includes a pair of temples or temple pieces 14, 15 each having respective earpieces 16, 17 terminating at somewhat enlarged respective ends 18, 19. The temple pieces 14, 15 are pivoted generally at 21, 22 to a front frame 23 having conventional lenses 24, 25, a bridge 26, and in some cases, nose pads or nose pieces 27.

The eyeglass cord 12 is an elongated piece of braided fabric material, and a typical example is a "Croakies" retainer or cord. The eyeglass cord 12 includes a medial portion 30 (FIG. 2) and opposite loop ends 31, 32 which in turn carry respective plastic loops 33, 34 having telescopically slid thereon metallic coil sleeves 35, 36, respectively. When the coil sleeves 35, 36 are slipped toward the loops 31, 32, respectively, the plastic loops 33, 34 can be slid readily over the ends 18, 19, respectively, of the respective temple pieces 14, 15. Thereafter the coil sleeves 35, 36 are moved toward the respective temple pieces 14, 15 to snugly close the loops 33, 34 thereabout so that the eyeglass cord 12 is firmly and securely retained upon the eyeglasses 11.

The novel protective cover 13 is a generally tubular member 40 having axially opposite open ends 41, 42 and a tubular interior 43. The tubular member 40 is preferably constructed from relatively resilient material, such as "Spandex" material which is directionally resilient. That is, the material stretches or elongates more in one direction than in another direction. Preferably the material from which the tubular member 40 is constructed is more circumferentially resilient or stretches more in the circumferential direction, as is indicated by the double-headed arrow C in FIG. 1, than in the axial direction, as is indicated by the double-headed arrow X in FIG. 1. The tubular member 40 is also preferably constructed from a single generally rectangular sheet of material which is folded flat upon itself, sewn to form a two-ply construction, and then formed into a tube and sewn to define an inner ply or sleeve 44 and an outer ply or sleeve 45. Identical means 46, 47 in the form of a pair of loops are sewn to the respective ends 41, 42 of the tubular member 40 and define means for facilitating the application of manual forces to the tubular member 40 to telescopically apply the same upon and remove the same from the eyeglasses 11, as will be described more fully hereinafter. However, the force applying means 46, 47 are each basically a loop grasping tab projecting axially from the respective ends 41, 42 which allows either tab 46, 47 to be grasped and pulled to remove or apply the tubular member 40 relative to the frame front 23 in either direction, namely, toward or away from the temple pieces 14, 15. Furthermore, in the "normal" unstressed condition of the tubular member 40 when the same is retained or "stored" upon the medial portion 30 of the eyeglass cord 12, the distance D of the tubular member 40 is somewhat less than the height H of the front frames 23. This dimensional relationship requires that the tubular member 40 be circumferentially stretched, as indicated by the circumferential resilience C, when positioned upon the frame front 23 and thus is retained thereupon, as will be noted more fully hereinafter. The circumferential stretching is obviously less in the area of the bridge 26 and at the openings 41, 42 and these areas are therefore somewhat constricted, as is best illustrated in FIGS. 1 and 3, to additionally assure that the tubular member 40 is retained upon the frame front 23.

Reference is now made to FIG. 2 which illustrates the protective cover 13 in its "stored" position upon the medial portion 30 of the eyeglass cord 12. The protective cover 13 is positioned as shown in FIG. 2 by first sliding the tubular member 40 upon the eyeglass cord 12 before both ends or loops 33, 34 are secured to the earpieces 16, 17, respectively. In the position shown in FIG. 2, the eyeglasses 11 are not covered and are suspended by the eyeglass cord 12 in a conventional manner with the front frame 23 resting against the upper chest area U of a wearer while the medial portion 30 is in partial encompassing relationship the user's neck N. The protective cover 13 is shown at the nape area A of the user's neck N, but, of course, since the tubular member 40 can be slid along the eyeglass cord 12 the protective cover 13 can be positioned virtually anywhere the user desires along not only the eyeglass cord 12 but even along the temple pieces 14, 15. However, it is assumed that the user is basically "using" the eyeglasses 10 in the sense that he or she is placing and/or replacing the eyeglasses 11 relative to the user'eyes, nose and ears. When the eyeglasses 11 are worn in their operative position (not shown), the protective cover 40 remains generally in the position shown in FIG. 2, and it is not until the user decides to cover the lenses 24, 25 that the tubular member 40 need be moved.

Should the user decide that it is time to protect the lenses 24, 25, the user need but grasp either of the tabs 46, 47 and pull the same in one direction or the other toward either of the looped ends 31, 32 and the associated earpiece ends 18, 19. The tubular member 40 is then pulled over one of the earpiece ends 18 or 19, the associated earpiece 16 or 17, and along either of the temple pieces 14, 15 and progressively along and fully upon the front frame 23 until reaching the position shown in FIG. 1. As was noted earlier, since the diameter of the tubular member 40 is less than the frame height H, the material of the protective cover 13 stretches circumferentially, again as indicated by the circumferential resilience C, and the tubular member 40 stretches circumferentially as it is applied upon and over the front frame 23. This stretching is greatest at the maximum height H of the front frame 23 and is, of course, less at the bridge 26 and less at the axially opposite ends (unnumbered) of the frame front 23 adjacent the hinges 21, 22. Thus the material of the protective cover 13 adjacent the ends 41, 42 is not circumferentially stretched appreciably, and the openings thereat are less than the height H which, of course, functions to prevent the end-wise displacement of the front frame axially through the open ends 41, 42. The circumferential resilience of the stretch material also grips the front frame 23 and retains the tubular member 40 snugly thereon. When thus covered in the manner shown in FIG. 1, the glasses still can be retained upon the neck N of the wearer/user in the manner shown in FIG. 2 until one decides to use the eyeglasses 11 once again after which one of the tabs 46, 47 is grasped and pulled to remove the protective cover 13 from the frame front 23 and slide the same along either of the temple pieces 14, 15 to the "stored" position shown in FIG. 2. However, it is apparent that when the protective cover 13 is in the position shown in FIG. 1, the entire combination 10 can be bodily removed from the neck N of the wearer and, for example, hung from a suitable support by the eyeglass cord 12. One such example was earlier given, namely, utilizing the eyeglass cord 12 to hang the covered and protected glasses of FIG. 1 from the mirror of a motor vehicle.

An alternative "storage" position to that just described would be to fold the temple pieces 14, 15 from the position shown in FIG. 1 to the folded position contiguous the protective cover 13 (not shown) and thereafter wrapping the eyeglass cord 12 around the thus folded temple pieces 14, 15 and the protective cover 13 housing the front frame 23. The eyeglass cord 12, particularly if made of cord or braided cloth, has sufficient "set" to retain this folded configuration, and the combination 10 can be placed upon a dashboard of a vehicle, within a glove compartment, or in one's pocket, and the user need not fear since the lenses 24, 25 are fully protected/covered by the protective cover 13.

Another storage position is achieved by imagining the glasses 11 of FIG. 2 being removed from the person and the temple pieces 14, 15 folded about the hinges 21, 22 in intimate relationship to each other and adjacent the frame front 23. Thereafter the tubular member 40 is slid from the medial portion 30 of the eyeglass cord 12 and will, of course, encounter either of the hinges 21, 22, not the ends 18, 19, because of the folded position of the temple pieces 14, 15 generally against/contiguous the frame front 23. Thus, as the tubular member 40 is being slid upon the folded eyeglasses 11 it will simultaneously slide over the hinge 22 and the portions of the frame front 23 and the earpiece 15 immediately adjacent thereto toward the hinge 21. In this case the open end 41 would slide from right-to-left in FIG. 1 after the folding of the eyeglasses 11, as heretofore described, with the open end 41 passing over and beyond the hinge 22 toward the hinge 21. If, of course, the tubular member 40 were inserted from the opposite direction, the open end 41 would slide first past the hinge 21 and the portions of the temple piece 14 and the frame front 23 adjacent thereto toward the hinge 22. In either case the temple pieces 14, 15 and the frame front 23 would be totally snugly housed within the protected cover 13 and only a minor portion of the eyeglass cord would remain outside of the protective cover 13. However, the portion of the eyeglass cord 12 exposed outside the tubular member 40 could still be used to suspend the folded and totally covered eyeglasses 10 from an appropriate support (a vehicle mirror or its support).

In further accordance with the invention, a generally elongated rectangular piece of chamois 50 is sewn along its periphery (unnumbered) to one face (unnumbered) of the tubular member 40 between the ends 41, 42 thereof. The chamois 50 prevents elongation in the direction A, and also serves as an excellent cleaning surface upon or against which the lenses 24, 25 of the glasses 11 can be cleaned.

Although a preferred embodiment of the invention has been specifically illustrated and described herein, it is to be understood that minor variations may be made in the apparatus without departing from the spirit and scope of the invention as defined in the appended claims.

I claim:

1. The combination of a pair of eyeglasses and a protective cover comprising a pair of eyeglasses defined by a frame front, lenses, bridge, nose pads and temples; a protective cover comprising a generally tubular member having axially opposite open ends, said tubular member being constructed from generally resilient material, said tubular member in a first operative condition of said combination snugly housing therein at least said frame front, lenses, bridge and nose pads, an elongated retainer having opposite ends secured one to each of said temples, and said tubular member in a second operative condition of said combination being in external sliding telescopic relationship to said frame front, temples and elongated retainer whereby said tubular member can be slipped to and from said front frame and to and from said elongated retainer generally along said temples.

2. The combination as defined in claim 1 wherein said tubular member material is resilient in at least a circumferential direction of said tubular member.

3. The combination as defined in claim 1 wherein said tubular member material is directionally resilient.

4. The combination as defined in claim 1 wherein said tubular member material is more resilient in a circumferential direction of said tubular member than in an axial direction of said tubular member.

5. The combination as defined in claim 1 including means contiguous at least one of said tubular member ends for facilitating the application of manual forces to said tubular member to telescopically apply the same upon and remove the same from an associated pair of eyeglasses.

6. The combination as defined in claim 1 including means contiguous at least one of said tubular member ends for facilitating the application of manual forces to said tubular member to telescopically apply the same upon and remove the same from an associated pair of eyeglasses, and said force applying means is a grasping tab carried by and projecting from said tubular member at least one end.

* * * * *